United States Patent [19]
Nakamoto

[11] Patent Number: 5,121,220
[45] Date of Patent: Jun. 9, 1992

[54] OCULAR TURRET TELESCOPE SYSTEM

[75] Inventor: Norio Nakamoto, Tokyo, Japan

[73] Assignee: Jason Empire, Inc., Overland Park, Kans.

[21] Appl. No.: 658,048

[22] Filed: Feb. 20, 1991

[51] Int. Cl.$^5$ .............................................. G02B 23/00
[52] U.S. Cl. .................... 359/419; 359/421; 359/821
[58] Field of Search ............. 359/419, 421, 503, 821, 359/885

[56] References Cited

U.S. PATENT DOCUMENTS

| | | | |
|---|---|---|---|
| 1,012,715 | 12/1911 | Saegmüller | 359/419 |
| 1,079,884 | 11/1913 | Schürmann | 359/419 |
| 1,196,811 | 9/1916 | Rayton et al. | 359/419 |
| 1,505,878 | 8/1924 | Erfle | 359/419 |
| 3,051,045 | 8/1962 | Miscuraca | 359/425 |
| 3,360,656 | 12/1967 | Kinnard | 359/889 |
| 3,554,630 | 1/1971 | Rogers, Jr. | 359/419 |
| 4,131,354 | 12/1978 | Hagiwara | 359/471 |
| 4,279,463 | 7/1981 | Little | 359/890 |
| 4,294,541 | 10/1981 | Abler | 359/405 |
| 4,930,883 | 6/1990 | Salzman | 359/419 |

FOREIGN PATENT DOCUMENTS 2226217 9/1990 Japan .................... 359/421

Primary Examiner—Carolyn E. Fields
Assistant Examiner—Drew A. Dunn
Attorney, Agent, or Firm—Litman, McMahon & Brown

[57] ABSTRACT

An ocular turret telescope system for attachment to a conventional reflecting or refracting telescope or other optical instrument includes a plurality of integrated optical adjustment features. A rack and pinion slidable adjustment provides a viewer with a resolution adjustment. A rotatable filter and magnification selection turret enables the selection of one of several filters and/or magnification levels. A selectable eyepiece housing enables the selection of one of several eyepiece barrels of different aperture sizes which are sighted along the telescope barrel via an internal, reflecting mirror mounted at a 45 degree angle. Also, an end-mounted specialized eyepiece or camera mount automatically urges the internal, reflecting mirror upward and out of the optical viewing path of the specialized eyepiece or camera when the eyepiece or camera is connected to the ocular turret system.

39 Claims, 4 Drawing Sheets

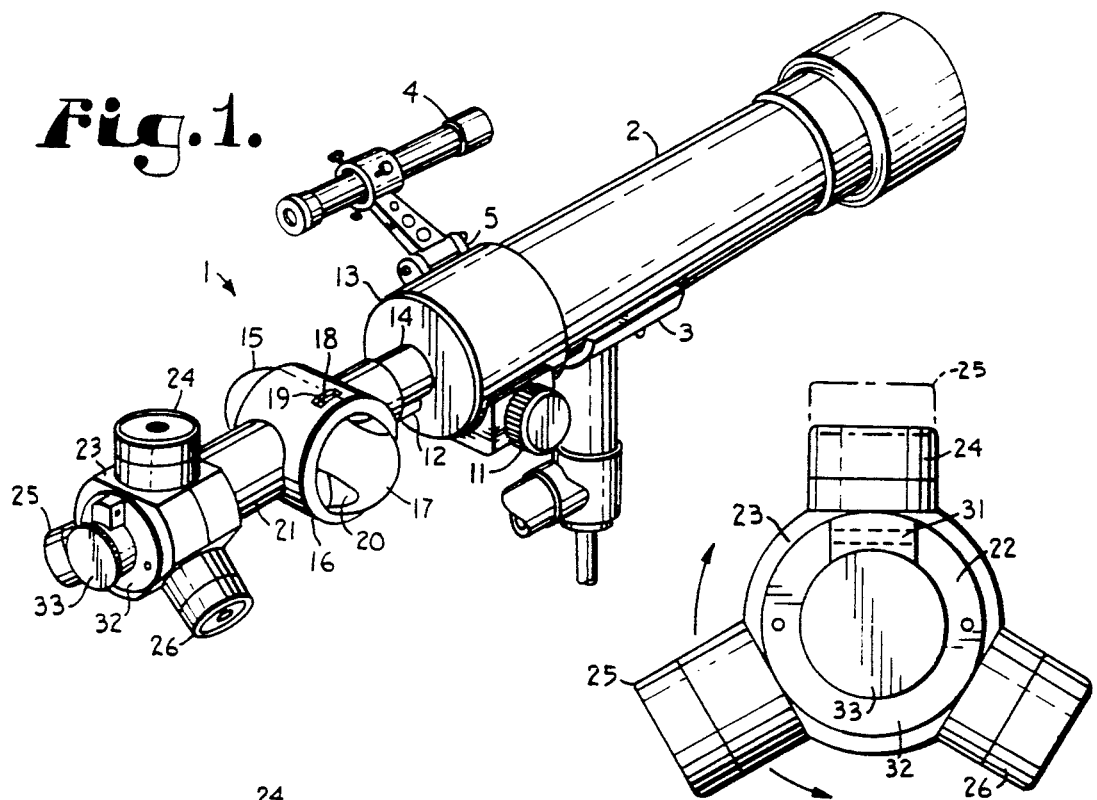
Fig.1.
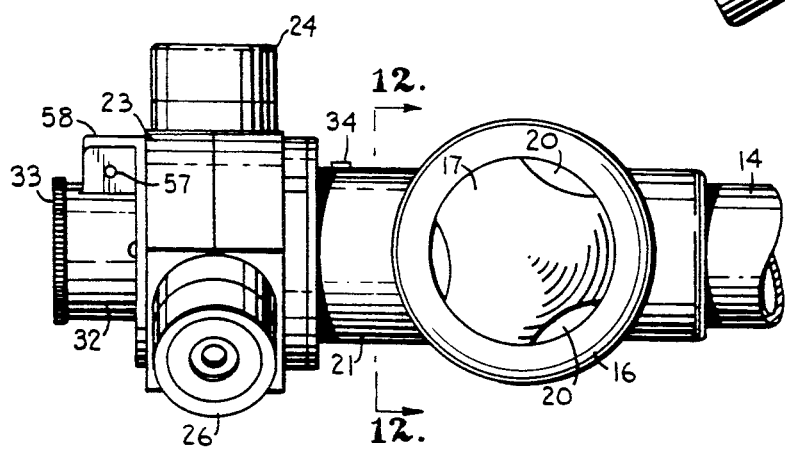
Fig.2.
Fig.3.
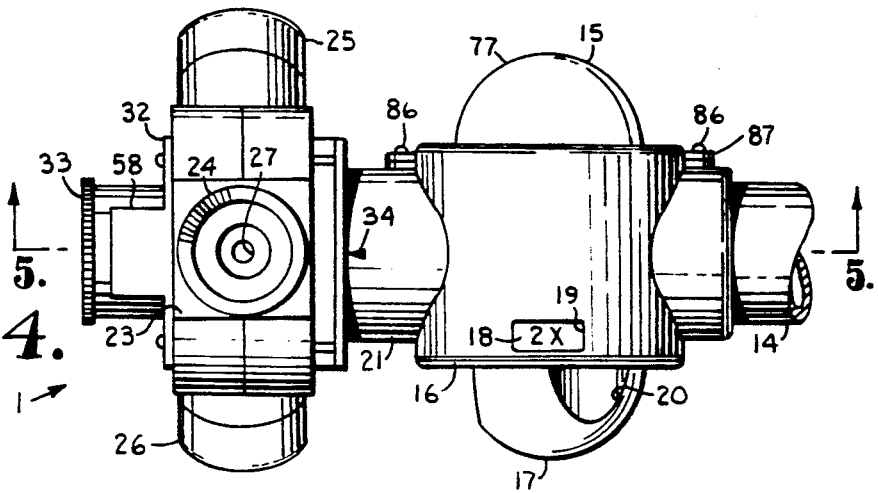
Fig.4.

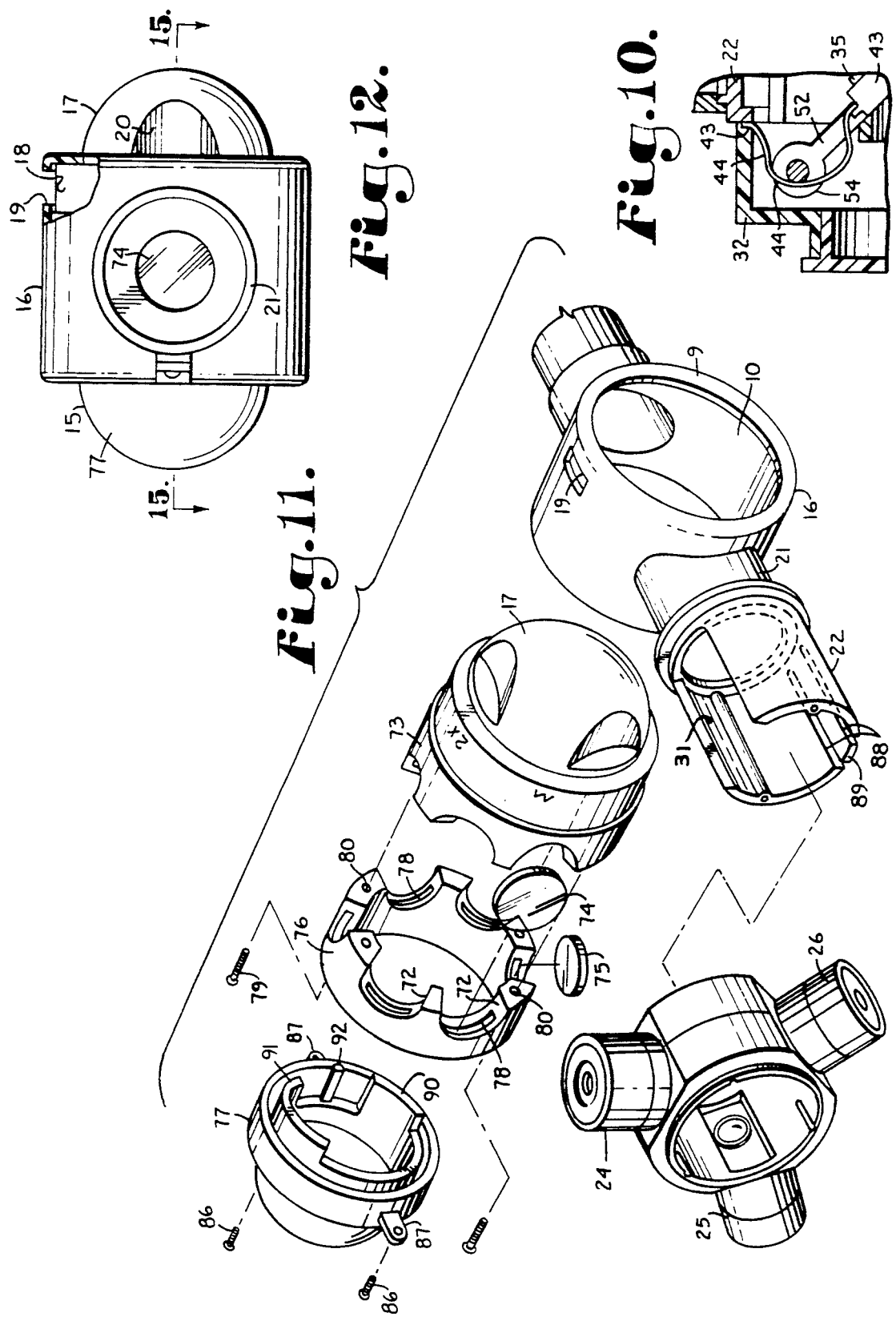

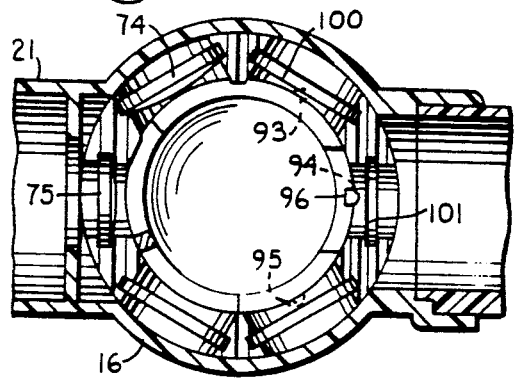
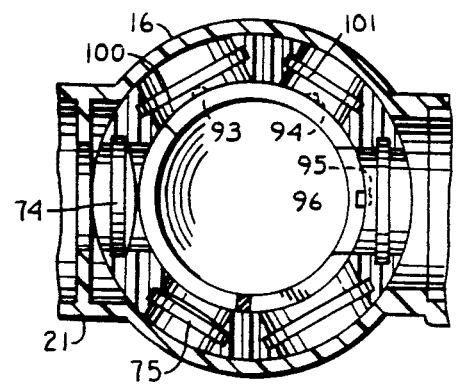
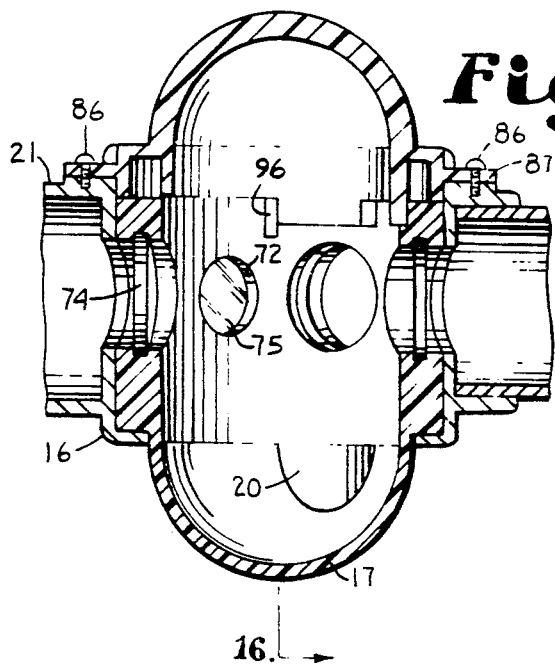
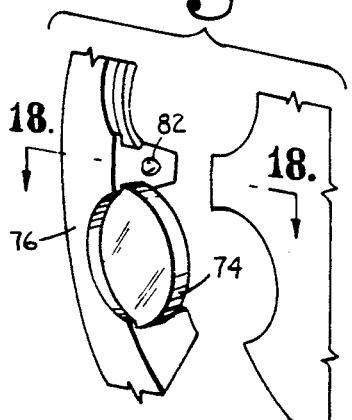
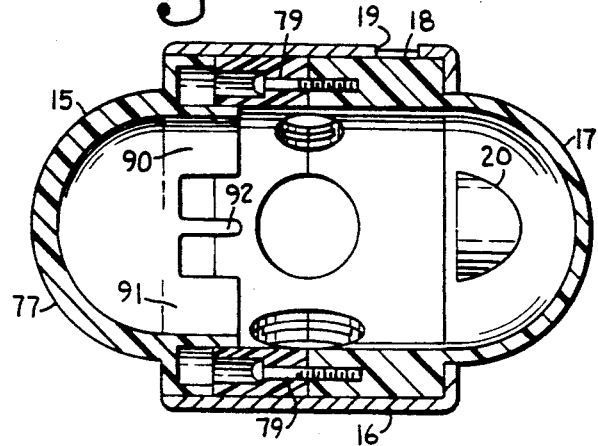
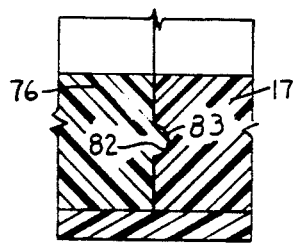

OCULAR TURRET TELESCOPE SYSTEM

BACKGROUND OF THE INVENTION

The present invention relates to an ocular turret system for attachment to a conventional reflecting or refracting telescope.

In order to achieve maximum usage and flexibility with an ordinary reflecting or refracting telescope, it is common to provide a plurality of accessory attachments which are used to modify the optical characteristics of the basic telescope. Typically these attachments include a plurality of filters which enable the telescope to be used in different lighting conditions, such as solar, lunar, or star observations, an eyepiece focusing mount which permits the eyepiece to be adjusted for optimum resolution for a particular viewer, a selectable magnification level and an aperture adjustment control which allows the aperture of an eyepiece to be enlarged or reduced. It is also common to provide further mounts which allow for the attachment of camera bodies or specialized eyepieces to the telescope.

The provision of multiple accessories such as these, while permitting a telescope user to achieve great flexibility, are also very unwieldy to transport and set up. In addition, the provision of so many different individual accessories greatly increases the chances of damage or loss of individual parts. Furthermore, once a telescope barrel is properly oriented to present the desired field of view, it is difficult if not impossible to make accessory changes, such as changing eyepieces and adding filters or magnifying lenses, without jarring the telescope barrel and upsetting the angle of orientation. Previous attempts to provide an eyepiece with an adjustable aperture have resulted in complex mechanisms which close and open an adjustable ring similar to the aperture control on a camera. This tends to increase the weight, complexity and cost of the telescope eyepiece. Prior attempts to provide plural optical viewing paths for auxiliary eyepiece or camera mounts via a mirror or other optical light director have required the telescope viewer to physically reorient the mirror or other optical light director when the auxiliary eyepiece or camera is attached or removed.

It is clear then, that a need exists for a single telescope accessory which provides precise focusing, readily changeable filters and/or magnification mounts, adjustable eyepiece apertures, and which provides for the attachment of cameras or other specialized eyepieces without requiring the user to reposition a mirror or other optical light director. It is also clear that such an accessory should be mechanically simple and should be capable of manufacture by readily available mass production techniques.

SUMMARY OF THE INVENTION

The present invention is an ocular turret telescope system for attachment to a conventional reflecting or refracting telescope or the like. The ocular turret system comprises an integrated series of user selectable optical modifiers which will be described in turn, starting from the telescope barrel and ending at the user.

The system first includes a telescope attachment cylinder which is adapted for direct connection with the main viewing barrel of the telescope. A smaller focusing cylinder is housed within the telescope attachment cylinder and is axially slidably adjustable relative to the telescope attachment cylinder via a rack and pinion system. This adjustment allows each user to adjust for the optimal optical resolution of the telescope for such a specific viewer. Attached to the rear of this focusing cylinder is a transverse cylindrical housing of larger diameter whose longitudinal axis runs perpendicular to the longitudinal axis of the focusing cylinder. This transverse cylindrical housing has a circular opening through both side walls of the housing, one of which connects with the focusing cylinder on one side and the other of which connects with an eyepiece cylinder on the other side. Mounted within this transverse cylindrical housing is a smaller rotatable filter and magnification selection turret which is concentric with said transverse housing. The filter and magnification selection turret has a plurality of apertures which contain various filters and/or magnifying lenses. By rotating the filter and magnification selection turret, different filters and/or magnification levels are selectively brought into the viewing plane of the ocular turret system.

Attached to the rear of the transverse cylindrical housing is the eyepiece cylinder which is aligned with the focusing cylinder and mates with the other of the circular openings in the transverse cylindrical housing. This eyepiece cylinder terminates in an eyepiece mounting cylinder which is concentric with and larger in diameter than the eyepiece cylinder. This eyepiece mounting cylinder has a rectangular cut-out on the top periphery thereof. A selectable, adjustable eyepiece apparatus comprises a circular ring housing which is placed over the eyepiece mounting cylinder and which is rotatable relative to the eyepiece mounting cylinder to bring a selected one of a plurality of eyepiece barrels and apertures into registration with the top cut-out in the eyepiece mounting cylinder. The plurality of eyepiece barrels are spaced at equal intervals around the periphery of this adjustable eyepiece housing and comprise, for example, three eyepiece barrels with three different sized apertures. By rotating this eyepiece housing, eyepieces of different apertures can be simply and reliably selected.

Attached to the rear of the eyepiece mounting cylinder is a mirror mounting disc assembly including a cover disc which is sized to cover the end of the eyepiece mounting disc with a bore positioned through the center of the cover disc and sized to accommodate the attachment of a specialized eyepiece or camera. The bore terminates in a circular extension flange which is concentric with the bore and which is tapered on the top at a 45 degree angle. A reflecting mirror and mirror support is hinge mounted in the mirror mounting disc assembly and is spring loaded so that the mirror is normally urged into contact with the 45 degree taper of the circular extension flange. This hinge mount is attached near the top of the mirror mounting disc assembly and is oriented such that, when a specialized eyepiece or camera is inserted into the bore of the mirror mounting disc, the mirror is urged up away from the circular extension flange and thus out of alignment with the bore in the cover disc. A plastic cap is provided for covering the bore in the mirror mounting disc assembly when no camera or specialized eyepiece is attached.

The integrated ocular turret system thus permits a telescope to be used in a plurality of situations and in a wide range of light conditions without the need for multiple accessory attachments.

OBJECTS AND ADVANTAGES OF THE INVENTION

The principle objects of the present invention are: to provide an improved ocular turret system for attachment to a conventional reflecting or refracting telescope or the like; to provide such a system that is light, compact and inexpensive to produce; to provide such a system which has an integral rotating turret which permits multiple filters or magnification levels to be selectively used with the telescope; to provide such a system which has a rack and pinion adjustment carriage to provide adjustment for optimum eyepiece optical resolution; to provide such a system which has multiple eyepiece barrels and apertures which can be selected by the user; to provide such a system which permits cameras or specialized eyepieces to be attached; to provide such a system which has an internal, reflecting mirror which is automatically adjusted when such cameras or specialized eyepieces are attached; to provide such a system which can be constructed of low cost molded plastic; to provide such a system which avoids the problems of multiple separate accessory attachments for a telescope; to provide such a system which is readily manufacturable by conventional mass production techniques; and to provide such a system that is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of an ocular turret system in accordance with the present invention shown mounted on a telescope.

FIG. 2 is an enlarged end view of the ocular turret system and arrows indicating alternative directions of rotation of the adjustable eyepiece.

FIG. 3 is an enlarged and fragmentary side elevational view of the ocular turret system.

FIG. 4 is an enlarged and fragmentary top plan view of the ocular turret system.

FIG. 10 is an enlarged and fragmentary cross-sectional view of the mirror support and a spring of the ocular turret system, taken along line 10—10 of FIG. 8.

FIG. 11 is an enlarged, perspective and exploded view of a portion of the ocular turret system, illustrating the construction of a rotating filter and magnification selection turret and the construction of a rotatable eyepiece.

FIG. 12 is an enlarged, cross-sectional end view of the rotating filter and magnification selection turret, taken along line 12—12 of FIG. 3.

FIG. 13 and 14 are enlarged and fragmentary side elevational views of the filter and magnification selection turret with portions broken away to show interior detail and with FIG. 13 showing a smaller moon filter and FIG. 14 showing a larger than normal view lens aligned with the optical axis of the telescope.

FIG. 15 is an enlarged and fragmentary cross-sectional view of the filter and magnification selection turret, taken along line 15—15 of FIG. 12.

FIG. 16 is an enlarged cross-sectional view of the filter and magnification selection turret, taken along line of 16—16 of FIG. 15.

FIG. 17 is an enlarged, perspective and fragmentary exploded view of the filter and magnification selection turret, illustrating the placement of one lens thereof.

FIG. 18 is an enlarged and fragmentary cross-sectional view of a portion of the filter and magnification selection turret, taken along line 18—18 of FIG. 17.

DETAILED DESCRIPTION OF THE INVENTION

Figure 5:
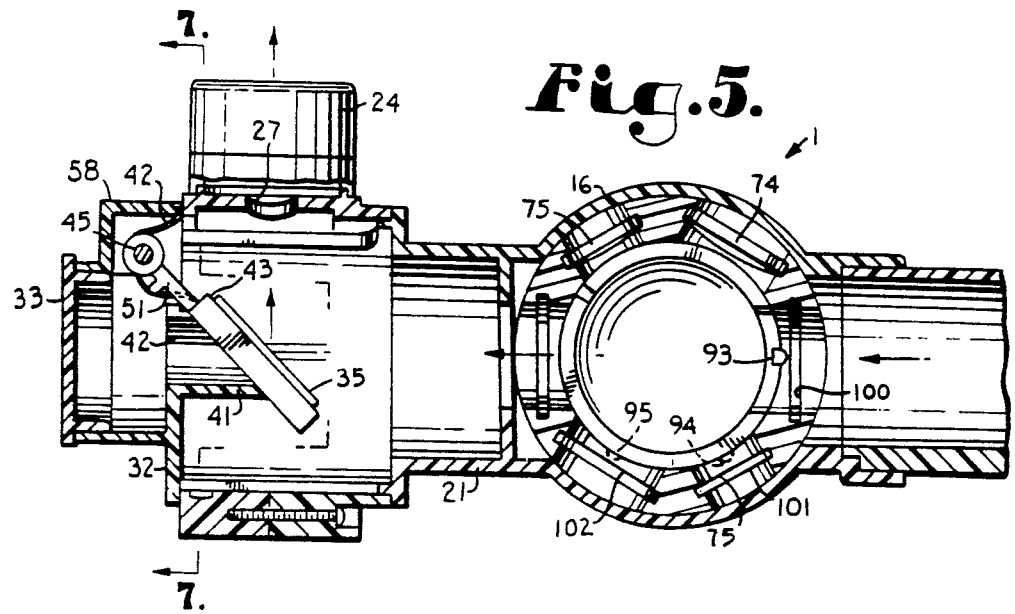
FIG. 5 is an enlarged and fragmentary cross-sectional view of the ocular turret system showing a mirror in a lowered position, taken along line 5—5 of FIG. 4.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1, there is shown an ocular turret system 1 in accordance with the present invention, attached to an ordinary reflecting or refracting telescope 2. The telescope 2 is conventionally mounted on a swivel base 3. A small sighting scope 4 is attached to a bracket 5 provided on the ocular turret system 1 for this purpose. FIG. 1 illustrates the component parts of the ocular turret system assembled and ready for use. These component parts include a large telescope attachment cylinder 13 which is attached directly to the barrel of telescope 2. A smaller focusing cylinder 14 is mounted within a bore through the center of the telescope attachment cylinder 13. The focusing cylinder 14 and the telescope attachment cylinder 13 are axially adjustable relative to each other via a rack and pinion mount 12 adjusted by rotation of a focus adjustment knob which moves the rack along the pinion of the mount 12 and consequently telescopes the cylinder 14 relative to the cylinder 13 respectively attached thereto. This arrangement permits a viewer to achieve precise focusing of the ocular turret system 1 to obtain optimum resolution of an image being viewed. The next segment of the ocular turret system 1, moving away from the telescope 2 and toward the viewing end, is a filter and magnification selection turret 15 housed within a transverse cylindrical housing 16. The filter and magnification selection turret 15 is rotatable within the transverse cylindrical housing 16 to permit a viewer to select different filters and/or magnification levels for the ocular turret system 1. Next in line, again moving away from the telescope 2, is an eyepiece cylinder 21 which opens at one end into a circular opening through a sidewall of the transverse cylindrical housing 16 and opens at the other end into a larger eyepiece mounting cylinder 22, best illustrated in FIG. 2.

Mounted on the eyepiece mounting cylinder 22 is a selectable eyepiece assembly comprising a circular ring housing 23 on which are mounted three eyepiece barrels 24, 25 and 26, each of which has a different sized viewing aperture. Eyepiece barrels of different apertures are alternatively selected by a user by rotating the selectable eyepiece ring 23 about the eyepiece mounting cylinder 22.

As best illustrated in FIG. 2, once one of the eyepieces, here indicated as eyepiece barrel 24, is rotated to a top-most position on the ocular turret system 1, the eyepiece barrel 24 is placed in alignment with a top rectangular cut-out 31 in the eyepiece mounting cylinder 22 which enables a viewer to peer through the eyepiece barrel 24 and into the interior of the ocular turret system 1.

Referring to FIG. 1 again, the last visible components to the left include a mirror mounting disc assembly 32 covering and attached to the end of the eyepiece mounting cylinder 22 and an end cap 33 which covers a bore 42 centered in the mirror mounting disk 32 to accommodate the attachment of specialized eyepieces (FIG. 6) or camera equipment (now shown) to the ocular turret system 1.

Referring again to FIG. 2, the selectable eyepiece ring 23 is rotatable relative to the eyepiece mounting cylinder 22 in either direction. This permits the desired eyepiece barrel 24, 25 or 26 to be placed over the cut-out 31 in the eyepiece mounting cylinder 22 within a minimum rotation angle. As previously mentioned, each of the eyepiece barrels 24, 25 and 26 can have a different aperture size. In one embodiment the aperture sizes were 4 mm for eyepiece barrel 24, 10 mm for eyepiece barrel 25 and 20 mm for eyepiece barrel 26. Alternatively, or in addition to the different aperture sizes, the eyepiece barrels 24–26 can also be provided with different optical filters or magnifying lenses, if desired.

FIG. 3 presents another view of the ocular turret system 1, illustrating an end view of the transverse cylindrical housing 16 and a turret selection knob 17 on the filter and magnification selection turret 15. The turret selector knob 17 has a plurality of indentations 20 to accommodate the fingers of a user to facilitate the rotation of the turret.

FIG. 4 is a top plan view of the ocular turret system 1 illustrating an aperture 27 of the selected eyepiece barrel 24, and a filter and magnification indicator 18 showing through a window 19 in the top of the transverse cylindrical housing 16. Also shown in FIG. 4 is a positioning arrow 34 on the top of the eyepiece cylinder 21, the positioning arrow 34 acting to indicate the proper position for the center of a selected aperture 27 in the selected eyepiece barrel 24. The filter and magnification indicator 18 comprises a plurality of alphanumeric characters embossed onto the filter and magnification selection turret 15. As the filter and magnification selection turret 15 is rotated relative to the transverse cylindrical housing 16, the alphanumeric character which indicates the selected filter or magnification level will appear in the window 19.

FIG. 5 is a cross-sectional view of the ocular turret system 1, taken along line 5—5 of FIG. 4. FIG. 5 illustrates the inner workings of both the filter and magnification selection turret 15 and the mirror mounting disk assembly 32 and an internal, reflecting mirror 35.

Figure 9:
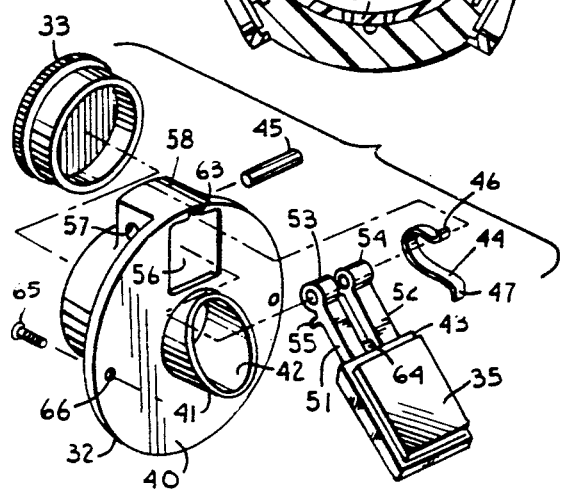
FIG. 9 is an enlarged, perspective and exploded view of a mirror mounting disc assembly, illustrating the mirror and mirror support system.

The construction of the mirror mounting disk assembly 32 will now be described with reference to FIGS. 5 and 9. As shown in FIG. 9, the mirror mounting disk assembly 32 has a circular cover disk 40 with a bore 42 positioned through the center. The mirror mounting disc assembly 32 has a circular extension flange 41 surrounding the bore 42 with the flange 41 having a tapered upper surface that is oriented at an angle of 45 degrees from the longitudinal axis of the bore 42. As shown in FIG. 5, this extension flange 41 provides support for the mirror 35 to orient it at a 45 degree angle relative to the longitudinal optical axis of the ocular turret system 1, when in a lowered position as seen in FIG. 5. Thus, light entering through the longitudinal axis of the ocular turret system 1 is reflected by the mirror 35 directly into the selected eyepiece barrel 24.

Referring again to FIG. 9, the mirror 35 is mounted on a mirror support 43. The mirror housing 43 is provided with two arms 51 and 52 which terminate in cylindrical end portions 53 and 54 respectively. Each of the cylindrical end portions 53 and 54 has a bore through the longitudinal axis of the respective cylinders that are coaxially aligned. Each of the arms 51 and 52 also has a base, cam or flange 55 incorporated therein whose purpose will be explained later.

Figure 8:
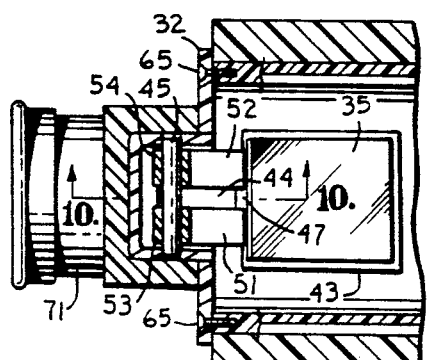
FIG. 8 is an enlarged and fragmentary cross-sectional view of the turret system, taken along line 8—8 of FIG. 6.

To assemble the mirror 35 and the mirror support 43 to the mirror mounting disk 32, the arms 51 and 52 are inserted through a rectangular opening 56 in the mirror mounting disk assembly 32 with the bores through the cylindrical end portions 53 and 54 aligned with a mating bore 57 through a pivot support 58 which is formed into the mirror mounting disk assembly 32. During this assembly a mirror spring 44 which terminates in spring flanges 46 and 47 is inserted in between the arms 51 and 52. The flange 46 cooperates with a flange engaging inset 63 formed above the rectangular opening 56 in the mirror mounting disk 32 while the flange 47 cooperates with a flange engaging ledge 64 formed in the mirror support 43 for this purpose. Once the spring 44 and the mirror support 43 are assembled, a mirror securing peg 45 is inserted through the bore 57 in the pivot support 58 and through the cooperating bores in the cylindrical end portions 53 and 54 to secure the mirror support 43, the mirror 35 and the spring 44 within the mirror mounting disk assembly 32. The thus-assembled mirror mounting disk assembly 32 is then attached to the eyepiece mounting cylinder 22 by a plurality of screws 65 which cooperate with bores 66 in the mirror mounting disk assembly 32 and similarly positioned threaded bores 67 within the eyepiece mounting cylinder 22, as illustrated in FIG. 8. Referring again to FIG. 5, the assembled mirror mounting disk assembly 32 is shown attached to the ocular turret system 1 with the mirror 35 positioned in its lowered 45 degree position as urged by the mirror spring 44 and as supported by the circular extension flange 41.

Figure 6:
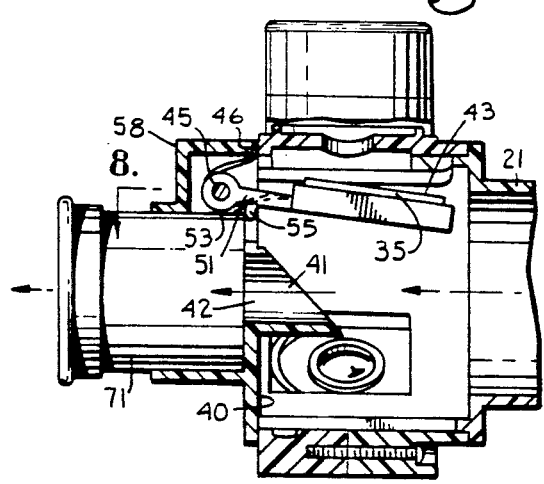
FIG. 6 is an enlarged and fragmentary cross-sectional view of the ocular turret system similar to FIG. 5, with an additional eyepiece inserted in the mirror mounting disc, forcing the mirror up and out of the viewing plane to a raised position.

FIG. 6 illustrates a specialized eyepiece 71 inserted into the bore 42 within the mirror mounting disk assembly 32. As the specialized eyepiece 71, which is sized to fit snugly within the bore hole 42, is inserted into the mirror mounting disk assembly 32, it contacts the cams or flanges 55 on arms 51 and 52 of the mirror support 43. As the eyepiece 71 is inserted further into the bore hole 42, the mirror support 43 is urged upward by the contact between the specialized eyepiece 41 and the flange 55, which acts to move the mirror 35 and the mirror support 43 out of the optical line of sight of the specialized eyepiece 71 and the ocular turret system 1. Thus, the mirror 35 is removed from the viewing plane of the specialized eyepiece 71 without any conscious intervention by the user. While the element 71 has been illustrated as a specialized eyepiece, it should be clear that a camera or other cooperating optical system could be equally effectively connected into the ocular turret system 1.

Figure 7:
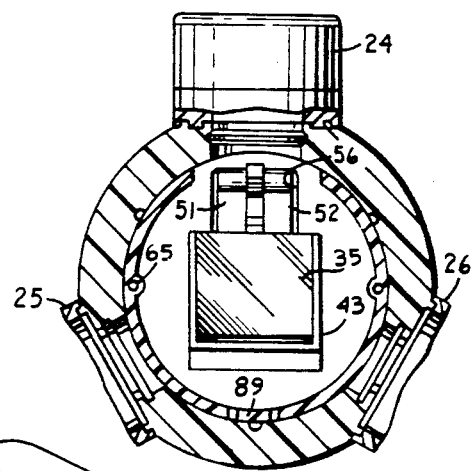
FIG. 7 is an enlarged cross-sectional view of the ocular turret system, taken along line 7—7 of FIG. 5.

FIG. 7 is a cross sectional view into the eyepiece mounting cylinder 22, taken along the line 7—7 of FIG. 5. The mirror 35 is shown in its lowered 45 degree position whereby light along the longitudinal viewing axis of the telescope barrel is reflecting upward through the aligned aperture 27 having a lens therein in the selected eyepiece barrel 24.

FIG. 8 is a top cross sectional view of the eyepiece mounting cylinder 22, taken along line 8—8 of FIG. 6, showing the mirror 35 rotated upward to a raised position thereof by the insertion of the specialized eyepiece 71.

FIG. 10 is a cross sectional view of the mirror support 43 and the spring 44, taken along line 10—10 of FIG. 8, but with the mirror 35 shown in the normal 45 degree position. FIG. 10 illustrates how the spring 44 is placed relative to the mirror support arms 51 (not shown) and 52. The spring 44 is stressed by the mirror securing peg 45 and the spring flanges 43 and 46, which are held in place when the mirror mounting disc assembly 32 is joined with the eyepiece mounting cylinder 22. The result is a downward spring action on the mirror support 43 which urges it into contact with the upper tapered edge of the circular extension flange 41 (FIG. 5).

FIG. 11 is an exploded view of the filter and magnification selection turret 15, the transverse cylindrical housing 16, the eyepiece cylinder 21, the eyepiece mounting cylinder 22 and the selectable eyepiece housing 23. The filter and magnification selection turret 15 comprises three main component parts, i.e., the turret selector knob 17, a lens holder 76, which cooperates with the turret selector knob 17, and a securing end piece 77 which fits over the lens holder 76 and secures the entire filter and magnification selection turret 15 within the transverse cylindrical housing 16.

A plurality of lenses and filters 74 and 75 are secured in apertures 72 formed in a cylindrical-shaped portion 73 of the selection turret 15 between the turret selector knob 17 and the lens holder 76. Both the turret selector knob 17 and the lens holder 76 have cooperating slots 78 in the lens apertures 72 for securely holding the lenses 74 and 75 within the apertures. The lens holder 76 is secured to the turret selector knob 17 by a plurality of screws 79 which cooperate with bores 80 in the lens holder 76 and which are threaded into mating threaded bores (not illustrated) within the turret selector knob 17. The lens holder 76 and the filter selector knob 17 are aligned during assembly by a plurality of pegs 82 which are molded into the lens holder 76 and which cooperate with indentations 83 in the filter selector knob 17, as illustrated in FIGS. 17 and 18, described below.

As previously mentioned, the entire filter and magnification selection turret 15 is held in place by the securing end piece 77 which cover the end of the lens holder 76 and which is securely fastened to the transverse cylindrical housing 16 by a plurality of screws 86 which cooperate with bores (not shown) in a like plurality of flanges 87 and which are threaded into cooperating threaded bores (not shown) on the periphery of the transverse cylindrical housing 16, as is best illustrated in FIG. 4.

The filter and magnification selection turret 15 is extremely versatile since different filters or magnifying lenses 74 and 75 can be inserted within the selector, or different selectors can be rapidly and easily removed and replaced. One example of a filter and lens arrangement for the selector includes a green tinted moon filter for the lens 75 and a 2× multiplier lens for the lens 74 with the remaining lens position left vacant so that a normal unfiltered and unmagnified position was available. Variations on this arrangement, of course, are many, e.g., two lenses or filters or a lens and a filter combination can be installed in each set of cooperating apertures in the turret, yielding a compound optical effect.

The securing end piece 77 has a domed disc shape and has three flanges 90, 91 and 92 extending inward from the dome and received into the interior of the lens holder 76. The lens holder 76 has indentations 93, 94, and 95 aligned with respective apertures 72 in each of the associated opposing aperture pairs, as shown in FIGS. 5, 13, and 14. The lens holder 76 also has a protrusion 96, best shown in FIG. 15, which engages the flanges 90 and 91 in the securing end piece 77 as the turret 15 is rotated. The flanges 90 and 91 cooperate with the protrusion 96 to limit the rotation arc of the turret 15 to approximately 120 degrees. As the turret 15 is rotated through this limited arc, the flange 92 engages each of the aperture pair indentations 93, 94 and 95 in turn, providing the viewer with a positive placement detente when the turret 15 is properly oriented to align each selected aperture pair 72 with the longitudinal optical axis of the ocular turret system 1.

The transverse cylindrical housing 16 has a circular flange 9 extending inward from one open end 10. The selector knob 17 has a cooperating ledge 8 which engages the circular flange 9 during assembly. This engagement and the screws 86 through the securing end piece 77, as was earlier described, secure the turret 15 within the transverse cylindrical housing 16.

FIG. 11 also illustrates the construction of the eyepiece mounting cylinder 22. As shown, the eyepiece mounting cylinder 22 has the top rectangular cut-out 31 which cooperates with the selected eyepiece barrel 24 that is in the vertical or upright position relative to the other barrels. The eyepiece mounting cylinder 22 also has a series of slots 88 which extend axially substantially the length of the eyepiece mounting cylinder 22 with a flexible and resilient tongue 89 therebetween. The combination of the slots 88 and the rectangular cut-out 31 act to make the eyepiece mounting cylinder 22 flexible enough to permit the selectable eyepiece housing 23 to be easily rotated about the periphery of the eyepiece mounting cylinder 22, yet resilient enough to hold it in position once it is properly oriented.

Referring again to FIG. 5 along with FIGS. 13 and 14, three different positions of the filter and magnification selection turret 15 are illustrated. In FIG. 5, the normal, or unmagnified and unfiltered apertures 100 have been selected and oriented along the longitudinal optical axis of the ocular turret system 1. FIG. 13 illustrates the smaller moon filter 101 so selected and oriented while FIG. 14 illustrates the 2× multiplier lens 102 so selected and oriented.

FIG. 12 shows a cross-sectional view along the optical axis of the ocular turret system 1, taken along line 12—12 of FIG. 3. FIG. 12 illustrates, from the viewers perspective, the view through the filter magnification selection turret 15. As shown by the alphanumeric indicator 18, the turret 15 is in the 2× magnification position.

FIG. 15 represents a downward cross-sectional view of the filter and magnification selection turret 15, taken along line 15—15 of FIG. 12. This view, along with the additional cross-sectional view of FIG. 16, taken along line 16—16 of FIG. 15, illustrate the fully assembled filter and magnification selector 15 and the relative positions of the various selectable filters and lenses.

FIG. 17, along with the cross-sectional view of FIG. 18, taken along line 18—18 of FIG. 17, illustrate the assembly of the lens holder 76 to the filter selector knob 17 with an intervening lens 74 inserted therebetween. As was earlier described, during assembly, a plurality of alignment protrusions 82 (only one of which is illustrated), molded into the lens holder 76, cooperate with a matching plurality of depressions 83 in the turret selector knob 17, to properly align the lens holder, 76, the lens 74, and the turret selector knob 17.

All of the illustrated parts of the ocular turret system 1, with the exception of the spring 44, the mirror 35 and the securing screws, can be constructed of inexpensive, high impact resistant molded plastic. Assembly and disassembly of the entire system is a simple procedure which can be easily accomplished. The ocular turret system 1 is modular in nature, permitting the simple replacement of any individual part without replacing the entire system.

While the ocular turret system 1 has been described as usable with a telescope 2, it should be apparent that it could be used with other optical devices in which a viewer looks through a viewing barrel, such as binoculars, periscopes, and camera sights. The ocular turret 1 has been illustrated with 3 selectable filters and/or magnification levels and with 3 eyepiece barrels; however, it is foreseen that any reasonable number of each could be included instead. The internal reflecting mirror could be replaced with a prism or other light directing apparatus to provide the multiple optical viewing paths needed. The general shape of the ocular turret system 1 has been described and illustrated as cylindrical, but other shapes, such as octagonal, for example, could be effectively used.

It is to be understood that while certain forms of the present invention have been illustrated and described herein, it is not to be limited to the specific forms or arrangement of parts described and shown.

What is claimed and desired to be secured by Letters Patent is as follows:

1. An ocular turret system adapted for connection to a main viewing barrel of an optical instrument; the system comprising:
   (a) a first barrel attachment cylinder adapted for attachment to the viewing end of said main viewing barrel;
   (b) a second cylinder mounted within said barrel attachment cylinder, the center of said second cylinder being positioned to align with the longitudinal optical axis of said main viewing barrel;
   (c) a transverse cylindrical housing attached to one end of said second cylinder and optically connected to said second cylinder through a first circular opening in the sidewall of said transverse cylindrical housing, said transverse cylindrical housing having a second circular opening in the sidewall opposite to and aligned with said first circular opening; and
   (d) a selection turret removably mounted within said transverse cylindrical housing and rotatable relative thereto about a common axis, said turret having a plurality of radially extending apertures about the periphery thereof, each of said apertures being associated with an opposing one of said apertures to form viewing pairs, said turret being positioned within said transverse cylindrical housing such that, when said turret is rotated, said pairs of apertures are sequentially brought into registration with said first and second circular openings in said transverse cylindrical housing whereby said pairs of apertures are individually selectable by rotating said turret.

2. The ocular turret system according to claim 1 wherein:
   (a) at least one of said apertures in said turret has positioned therein a structure selected from a group consisting of optical filters or magnifying lenses whereby different filters and magnification levels are selectable by rotating said turret.

3. The ocular turret system according to claim 2 wherein:
   (a) said turret has a selector knob protruding from one end of said transverse cylindrical housing, said selector knob including at least one indentation sized to accommodate a finger of a viewer to facilitate the rotation of said turret.

4. The ocular turret system according to claim 3 wherein:
   (a) said transverse cylindrical housing has a window in the top periphery thereof; and
   (b) said turret has a plurality of alphanumeric indicators on the outside periphery thereof, said indicators being positioned such that, as said turret is rotated within said transverse cylindrical housing, said indicators align with said window to provide an indication of the selected aperture pair.

5. The ocular turret system according to claim 2 wherein:
   (a) said turret comprises a plurality of mating portions, said apertures being formed between two of said mating portions so that said optical filters and said lenses can be installed and removed.

6. The ocular turret system according to claim 5 wherein:
   (a) one of said two mating portions has a plurality of alignment protrusions in a mating surface thereof; and
   (b) the other of said two mating portions has a like plurality of matching depressions in a mating surface thereof, wherein said protrusions and said depressions cooperate to properly align said two mating portions when said turret system is assembled.

7. The ocular turret system according to claim 5 wherein:
   (a) said apertures between said two mating portions include slots in at least one of said mating portions for securing said filters and lenses within said apertures.

8. The ocular turret system according to claim 5 wherein:
   (a) one of said two mating portions includes a cylindrical selector knob adapted to partially protrude from one end of said transverse cylindrical housing, the other of said two mating portions includes a cylindrical lens holder; and
   (b) said turret also includes a securing end piece that covers one end of said lens holder and that secures said turret within said transverse cylindrical housing by a plurality of screws that extend through a like plurality of bores in flanges attached to said securing end piece, and said screws are threaded into threaded bores located about the periphery of one end of said transverse cylindrical housing.

9. The ocular turret system according to claim 8 wherein:
   (a) the other end of said transverse cylindrical housing has a circular flange extending inward from the periphery thereof; and
   (b) said selector knob has a cooperating ledge to engage said circular flange and a knob portion which protrudes through the center of said circular flange to permit a viewer to rotate said turret.

10. The ocular turret system according to claim 9 wherein:
    (a) said knob portion has at least one indentation sized to accommodate a finger of said viewer to facilitate rotation of said turret.

11. The ocular turret system according to claim 9 wherein:
    (a) said lens holder has a protrusion and a plurality of indentations in the inside periphery of the end that is covered by said securing end piece, the number of indentations being equal to the number of pairs of opposing apertures in said turret; and
    (b) said securing end piece includes a dome shaped disc with a plurality of flanges that extend inward from said dome shaped disc;
    (c) said protrusion in said lens holder is confined between a pair of said flanges during rotation of said turret to limit the rotating arc of said turret; and
    (d) a third of said flanges sequentially engages said plurality of indentations in said lens holder as said turret is rotated through said arc to provide a series of positive detents to allow the viewer to properly orient said turret apertures along the optical axis of said ocular turret system.

12. The ocular turret system according to claim 1 wherein:
    (a) said plurality of apertures in said turret include apertures of different diameters.

13. The ocular turret system according to claim 1 wherein:
    (a) an eyepiece cylinder extension optically connects at one open end to said second circular opening in said transverse cylindrical housing;
    (b) said eyepiece cylinder extension optically connecting at a opposite open end thereof to one end of an eyepiece mounting cylinder that is concentric with said eyepiece cylinder extension, said eyepiece mounting cylinder being open at the other end and having a cut-out opening on the top periphery thereof;
    (c) a selectable eyepiece housing comprising a generally circular ring having a plurality of selectable eyepiece barrels mounted about the periphery thereof; each of said barrels including a respective viewing aperture optically connecting with an interior of said ring, said ring being placed over said eyepiece mounting cylinder and being rotatable relative thereto about a common axis to selectably bring said eyepiece barrels into registration with said top cut-out opening in said eyepiece mounting cylinder.

14. The ocular turret system according to claim 13 wherein:
    (a) each of said eyepiece barrels has a unique aperture diameter so that different apertures of various diameters are selectable by rotating said eyepiece mounting cylinder.

15. The ocular turret system according to claim 13 wherein:
    (a) a mirror mounting disc assembly is secured over said open end of said eyepiece mounting cylinder, said mirror mounting disc assembly having a circular bore through the center thereof which terminates at one end in an interior circular extension flange having an axis optically aligned with said barrel attachment cylinder, said circular extension flange having a mirror engaging surface which is tapered at a 45 degree angle relative to the longitudinal axis of said eyepiece mounting cylinder; and
    (b) an internal, reflecting mirror is attached to said mirror mounting disc assembly that is supported at said 45 degree angle by a top tapered surface of said circular extension flange when in a lowered position thereof.

16. The ocular turret system according to claim 15 wherein:
    (a) said mirror is mounted on a mirror support, said mirror support being hingeably mounted on said mirror mounting disc assembly; and
    (b) a biasing spring is attached to said mirror support and to said mirror mounting disc assembly, said spring normally forcing said mirror support downward in said lowered position into contact with said top tapered surface of said circular extension flange.

17. The ocular turret system according to claim 16 wherein:
    (a) said bore that is centered in said mirror mounting disc assembly is sized and adapted to accommodate a specialized cylinder that is selectively insertable into a distal end of said bore;
    (b) said mirror support includes a cam that is engaged by said specialized cylinder when said specialized cylinder is inserted into said bore;
    (c) said specialized cylinder cooperatively acting with said cam to bias against a spring force to push said mirror support upward into a raised position thereof and out of alignment with said bore so that the longitudinal optical axis of said ocular turret system is opened to said specialized cylinder.

18. The ocular turret system according to claim 17 wherein: (a) said distal end of said bore is covered by an end cap when no specialized cylinder is inserted therein.

19. The ocular turret system according to claim 1 wherein:
    (a) said second cylinder and said barrel attachment cylinder are linearly movable relative to each other via a rack and pinion adjustment mount to provide a viewer with a focusing capability to achieve optimal optical resolution.

20. An ocular turret system adapted for connection to a main viewing barrel of an optical instrument; the system comprising:
  (a) a first barrel attachment cylinder adapted for attachment to the viewing end of said main viewing barrel;
  (b) a second cylinder mounted within said barrel attachment cylinder with the center of said second cylinder adapted to being positioned to align with the longitudinal optical axis of said main viewing barrel;
  (c) an eyepiece cylinder extension aligned at a first open end with said second cylinder;
  (d) said eyepiece cylinder extension connecting at a second open end to one end of an eyepiece mounting cylinder that is concentric with said eyepiece cylinder extension, said eyepiece mounting cylinder being open at an opposite end and having a cut-out opening on the periphery thereof;
  (e) a selectable eyepiece housing comprising a generally circular ring having a plurality of selectable eyepiece barrels mounted about the periphery thereof; each of said barrels include respective apertures connecting with the interior of said ring, said ring being placed over said eyepiece mounting cylinder and being rotatable relative thereto about a common axis to selectably bring said eyepiece barrels into registration with said cut-out opening in said eyepiece mounting cylinder.

21. The ocular turret system according to claim 20 wherein:
  (a) a mirror mounting disc assembly is secured over said open end of said eyepiece mounting cylinder, said mirror mounting disc assembly having a circular bore through the center thereof that terminates at one end in an interior circular extension flange, said circular extension flange having a mirror engaging surface that is tapered at a 45 degree angle relative to the longitudinal axis of said eyepiece mounting cylinder; and
  (b) an internal, reflecting mirror attached to said mirror mounting disc assembly; said mirror being supported at said 45 degree angle by said tapered surface of said circular extension flange when in a lowered position thereof.

22. The ocular turret system according to claim 21 wherein:
  (a) said mirror is mounted on a mirror support, said mirror support being hingeably mounted on said mirror mounting disc assembly; and
  (b) biasing means are attached to said mirror support and to said mirror mounting disc assembly said biasing means, normally forcing said mirror support downward into contact with said tapered surface of said circular extension flange.

23. The ocular turret system according to claim 22 wherein:
  (a) said bore that is centered in said mirror mounting disc assembly is sized to accommodate a specialized cylinder that is selectively insertable into a distal end of said bore;
  (b) said mirror support includes a cam that is engaged by said specialized cylinder when said specialized cylinder is inserted into said bore;
  (c) said specialized cylinder urging said cam and said mirror support against said biasing means to push said mirror to a raised position thereof out of alignment with said bore so that the longitudinal optical axis of said ocular turret system is opened to said specialized cylinder.

24. The ocular turret system according to claim 23 wherein:
  (a) said distal end of said bore is covered by an end cap when no specialized cylinder is inserted therein.

25. The ocular turret system according to claim 20 wherein:
  (a) said second cylinder and said barrel attachment cylinder are linearly movable relative to each other via a rack and pinion adjustment mount to provide a viewer with a focusing capability to achieve optimal optical resolution.

26. The ocular turret system according to claim 20 wherein:
  (a) a transverse cylindrical housing is connected to one end of said second cylinder through a first circular opening in the sidewall of said transverse cylindrical housing, said transverse cylindrical housing having a second circular opening in the sidewall opposite to and aligned with said first circular opening, said second circular opening connecting with said eyepiece extension cylinder; and
  (b) a filter and magnification selection turret that is removably mounted within said transverse cylindrical housing and that is rotatable relative thereto about a common axis, said turret having a plurality of radially extending apertures located about the periphery thereof, each of said apertures being associated with an opposing one of said apertures to form viewing pairs, said turret being positioned within said transverse cylindrical housing such that, when said turret is rotated, said pairs of apertures are sequentially optically brought into registration with said first and second circular openings in said transverse cylindrical housing whereby said pairs of apertures are individually selectable by rotating said turret.

27. The ocular turret system according to claim 26 wherein:
  (a) at least one of said apertures has positioned therein a structure selected from the group consisting of optical filters and magnifying lenses whereby different filters or magnification levels ar selectable by rotting said turret.

28. The ocular turret system according to claim 26 wherein:
  (a) said turret has a selector knob protruding from one end of said transverse cylindrical housing, said selector knob including at least one indentation sized to accommodate a finger of a viewer to facilitate the rotation of said turret.

29. The ocular turret system according to claim 26 wherein:
  (a) said turret comprises a plurality of mating portions, said apertures being formed between two of said mating portions so that said optical filters and said lenses can be installed and removed.

30. The ocular turret system according to claim 29 wherein:
  (a) one of said two mating portions has a plurality of alignment protrusions in a mating surface thereof; and
  (b) the other of said two mating portions has a like plurality of matching depressions in a mating surface thereof, wherein said protrusions and said depressions cooperate to properly align said two mating portions during assembly.

31. The ocular turret system according to claim 29 wherein:
(a) said apertures between said two mating portions include slots in at least one of said mating portions for securing said filters and lenses within said apertures.

32. The ocular turret system according to claim 29 wherein:
(a) a first of said two mating portions includes a cylindrical selector knob adapted to partially protrude from one end of said transverse cylindrical housing, a second of said two mating portions includes a cylindrical lens holder; and
(b) said turret includes a securing end piece that covers one end of said lens holder and that secures said turret within said transverse cylindrical housing by a plurality of fasteners.

33. The ocular turret system according to claim 32 wherein:
(a) the other end of said transverse cylindrical housing has a circular flange extending inward from the periphery thereof; and
(b) said selector knob has a cooperating ledge to engage said circular flange and a knob portion that protrudes through the center of said circular flange to permit a viewer to rotate said turret.

34. The ocular turret system according to claim 33 wherein:
(a) said knob portion has at least one indentation sized to accommodate a finger of said viewer to facilitate rotation of said turret.

35. The ocular turret system according to claim 33 wherein:
(a) said lens holder has a protrusion and a plurality of indentations in the inside periphery of the end that is covered by said securing end piece, the number of indentations being equal to the number of pairs of opposing apertures in said turret; and
(b) said securing end piece includes a dome shaped disc with three flanges which extend inward from said dome shaped disc;
(c) said protrusion in said lens holder being confined between two of said flanges during rotation of said turret to limit the rotation arc of said turret; and
(d) the third flange engaging said plurality of indentations in said lens holder as said turret is rotated through said arc to provide a series of positive detents to allow said viewer to properly orient said turret apertures in the optical axis of said ocular turret system.

36. The ocular turret system according to claim 20 wherein:
(a) said second cylinder and said barrel attachment cylinder are linearly movable relative to each other via a rack and pinion adjustment mount to provide a viewer with a focusing capability to achieve optimal optical resolution.

37. An ocular turret system adapted for connection to a main viewing barrel of an optical instrument; the system comprising:
(a) a first barrel attachment cylinder adapted for attachment to the viewing end of said main viewing barrel;
(b) a second cylinder mounted within said barrel attachment cylinder, the center of said second cylinder adapted to align with the longitudinal optical axis of said main viewing barrel;
(c) a transverse cylindrical housing attached to a first end of said second cylinder and connected to said second cylinder through a first circular opening in the sidewall of said transverse cylindrical housing, said transverse cylindrical housing having a second circular opening in the sidewall opposite to and aligned with said first circular opening; and
(d) a filter and magnification selection turret removably mounted within said transverse cylindrical hosing and rotatable relative thereto about a common axis, said turret comprising a plurality of apertures about the periphery thereof, each of said apertures being associated with an opposing one of said apertures to form viewing pairs with at least a first of the apertures receiving a first lens and a second of said apertures receiving a second lens different than said first lens; said turret being positioned within said transverse cylindrical housing such that, when said turret is rotated, said pairs of apertures are sequentially brought into registration with said first and second circular openings in said transverse cylindrical housing whereby said pairs of apertures are individually selectable by rotting said turret;
(e) an eyepiece cylinder extension optically connected at one end thereof to said second circular opening in said transverse cylindrical housing;
(f) said eyepiece cylindrical extension optically connected connecting at a second end thereof to one end of an eyepiece mounting cylinder that is concentric with said eyepiece cylinder extension, said eyepiece mounting cylinder being open at a second end thereof and having a cut-out opening on the periphery thereof; and
(g) a selectable eyepiece housing comprising a generally circular ring about the periphery of which are mounted a plurality of selectable eyepiece barrels; each of said barrels include a respective viewing apertures optically connecting with the interior of said ring, said ring being placed over said eyepiece mounting cylinder and being rotatable relative thereto about a common axis to selectably bring said eyepiece barrels into registration with said cut-out opening in said eyepiece mounting cylinder.

38. In a telescope optical viewing apparatus having a main viewing barrel, the improvement comprising:
(a) a transverse cylindrical housing optically connected at a first end thereof to said main viewing barrel through a first circular opening in the sidewall of said transverse cylindrical housing; said transverse cylindrical housing having a second circular opening in the sidewall opposite to and optically aligned with said first circular opening; and
(b) a selection turret removably mounted within said transverse cylindrical housing and rotatable relative thereto about a common axis, said turret having a plurality of radially extending apertures about the periphery thereof with at least one of said apertures receiving a lens therein; each of said apertures being associated with an opposing one of said apertures to form viewing pairs; said turret being positioned within said transverse cylindrical housing such that, when said turret is rotated, said pairs of apertures are sequentially brought into optical registration with said first and second circular openings in said transverse cylindrical housing whereby said pairs of apertures are individually selectable by rotating said turret.

39. In a telescope optical viewing apparatus having a main viewing barrel, the improvement comprising:
(a) an eyepiece mounting cylinder that is optically connected at a first end thereof to said main viewing barrel; said eyepiece mounting cylinder having a cut-out opening on the periphery thereof; and
(b) a selectable eyepiece housing comprising a generally circular ring having a plurality of selectable eyepiece barrels mounted about the periphery thereof; each of said barrels include respective viewing apertures optically connecting with the interior of said ring, said ring being placed over said eyepiece mounting cylinder and being rotatable relative thereto about a common axis to selectably bring said eyepiece barrels into registration with said cut-out opening in said eyepiece mounting cylinder.

* * * * *